United States Patent
Jacobsen et al.

(10) Patent No.: US 7,320,782 B1
(45) Date of Patent: *Jan. 22, 2008

(54) PROCESS FOR PREPARING A LAYERED MOLECULAR SIEVE COMPOSITION

(75) Inventors: Lance L. Jacobsen, Lake Zurich, IL (US); Brian S. Konrad, Schaumburg, IL (US); David A. Lesch, Hoffman Estates, IL (US); Julio C. Marte, Carol Stream, IL (US); Beckay J. Mezza, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 515 days.

This patent is subject to a terminal disclaimer.

(21) Appl. No.: 10/867,510

(22) Filed: Jun. 14, 2004

(51) Int. Cl.
*B01J 29/00* (2006.01)
*B01J 29/06* (2006.01)
*B01J 29/83* (2006.01)
*B01J 29/84* (2006.01)
*B01J 29/85* (2006.01)
*C01B 25/45* (2006.01)
*C01B 25/37* (2006.01)
*C01B 25/36* (2006.01)
*C01B 33/26* (2006.01)

(52) U.S. Cl. .................. 423/700; 423/716; 423/305; 423/306; 502/60; 502/64; 502/208; 502/214

(58) Field of Classification Search ........... 423/700, 423/716, 305, 306; 502/60, 64, 208, 214
See application file for complete search history.

(56) References Cited

U.S. PATENT DOCUMENTS

| | | | | |
|---|---|---|---|---|
| 3,730,910 A | * | 5/1973 | Albers et al. ............... | 502/65 |
| 4,088,605 A | | 5/1978 | Rollmann ............... | 252/455 Z |
| 4,283,583 A | | 8/1981 | Velenyi et al. ............. | 585/467 |
| 4,482,774 A | | 11/1984 | Koetsier ..................... | 585/481 |
| 5,258,339 A | * | 11/1993 | Ma et al. ..................... | 502/4 |
| 5,266,542 A | * | 11/1993 | Hashimoto et al. ......... | 502/64 |
| 5,723,397 A | * | 3/1998 | Verduijn ..................... | 502/4 |
| 5,895,769 A | | 4/1999 | Lai ............................. | 502/4 |
| 5,935,889 A | | 8/1999 | Murrell et al. .............. | 502/9 |
| 6,013,851 A | | 1/2000 | Verrelst et al. ............. | 585/533 |
| 6,033,458 A | * | 3/2000 | Goodman et al. .......... | 95/45 |
| 6,274,207 B1 | * | 8/2001 | Balkus et al. ............... | 427/596 |
| 6,649,802 B1 | * | 11/2003 | Frame et al. ............... | 585/533 |
| 6,773,694 B1 | * | 8/2004 | Lesch et al. ................ | 423/709 |
| 7,049,259 B1 | * | 5/2006 | Deckman et al. ........... | 502/4 |

* cited by examiner

*Primary Examiner*—David M Brunsman
(74) *Attorney, Agent, or Firm*—Frank S Molinaro

(57) ABSTRACT

A process for preparing a layered composition has been developed. The composition comprises an inner core and an outer layer comprising a molecular sieve. The process involves providing a slurry comprising inner core particles and sources of the framework elements of the molecular sieve. To this slurry there are added nutrient(s), i.e. framework element sources thereby forming crystals of the molecular sieve which agglomerate onto the inner core. The process is carried out for a time sufficient to form a layer of desired thickness.

16 Claims, No Drawings

PROCESS FOR PREPARING A LAYERED MOLECULAR SIEVE COMPOSITION

FIELD OF THE INVENTION

This invention relates to a process for preparing a layered composition where a molecular sieve layer is formed onto core particles. The process comprises taking a slurry comprising inner core particles and adding to it reactive sources of the framework element(s) of the molecular sieve thereby forming molecular sieve crystals which agglomerate onto the inner core and form a molecular sieve layer.

BACKGROUND OF THE INVENTION

Molecular sieves are used as catalysts in various hydrocarbon conversion processes. In most processes the molecular sieves are formed into shaped articles such as spheres, extrudates, etc. It has been found that some of the processes are diffusionally limited and thus the molecular sieve on the interior of the shaped articles are not utilized in the reaction. Alternatively, owing to the long diffusion path, compounds can undergo further reactions leading to the formation of undesirable byproducts. Further, these shaped particles are formed using some catalytically inert binder and thus a pure molecular sieve is not available to catalyze the reaction.

There are a number of references which disclose layered compositions. For example, U.S. Pat. No. 4,283,583 discloses a coated zeolite catalyst consisting of an inert core and an outer coating comprising an active catalytic zeolite material. The catalyst is prepared by wetting the inner core partially drying and then contacting the core with a zeolite powder. U.S. Pat. No. 4,482,774 discloses a composite zeolite having a crystalline silica polymorph as the core material and a modified silica overlayer which has substantially the same crystalline structure. The overlayer is formed by adding preformed particles of the silica core into a crystallization gel at crystallization conditions thereby crystallizing the zeolite onto the core. U.S. Pat. No. 4,088,605 discloses growing a substantially aluminum free shell onto an aluminum containing zeolite. U.S. Pat. No. 5,895,769 discloses depositing a polycrystalline zeolite onto a porous substrate. U.S. Pat. No. 5,935,889 discloses preparing catalyst particles by coating core particles with an atomized slurry containing a coating material. Finally, U.S. Pat. No. 6,013,851 discloses a core zeolite having deposited thereon a surface layer where the surface layer has a higher Si/Al ratio than the core.

In contrast to these references, applicants have developed a process which grows a molecular sieve layer onto an inner core. The process involves providing a slurry comprising inner core particles and then adding to the slurry reactive sources (nutrient(s)) of the framework element(s) of the molecular sieve in order to form crystals of the molecular sieve. As the crystals form, they agglomerate onto the inner core and after sufficient time form the desired layer thickness. A preferred procedure involves first adding the nutrient(s) intermittently to form crystals and then adding the nutrients continuously to grow the crystals that have agglomerated onto the inner core.

SUMMARY OF THE INVENTION

As stated this invention relates to a process for preparing a layered composition comprising an inner core and an outer layer, the outer layer comprising a molecular sieve having a three dimensional microporous framework structure and a framework composition represented by an empirical formula of:

$$(El_wAl_xP_ySi_z)O_2 \tag{1}$$

where El, Al, P and Si are framework elements present as tetrahedral oxide units, "w" is the mole fraction of El and has a value from 0 to about 0.5, "x" is the mole fraction of Al and has a value from 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero, the process comprising providing at reaction conditions a slurry comprising inner core particles dispersed in a liquid comprising reactive sources of El, Al, P, Si corresponding to formula (1); intermittently adding to the slurry nutrient(s) to provide framework element(s) of the molecular sieve per formula (1), thereby forming crystals of the molecular sieve and agglomerating the crystals onto the inner core and carrying out the intermittent addition for a first time period to form a first layer of the molecular sieve on the inner core.

The present invention also relates to a layered composition comprising an alpha alumina inner core and an outer layer comprising a molecular sieve having a three dimensional microporous framework structure and a framework composition represented by an empirical formula of:

$$(El_wAl_xP_ySi_z)O_2 \tag{1}$$

where El, Al, P and Si are framework elements present as tetrahedral oxide units, "w" is the mole fraction of El and has a value from 0 to about 0.5, "x" is the mole fraction of Al and has a value from 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero, wherein the molecular sieve layer is bonded to the inner core by the agglomeration of molecular sieve crystals.

These and other objects and embodiments of this invention will become more apparent after the following detailed description of the invention.

Additional objects, embodiments and details of this invention can be obtained from the following detailed description of the invention.

DETAILED DESCRIPTION OF THE INVENTION

An essential element of the present invention is an inner core. The inner core is inert where inert means that substantially no chemical change occurs to the core either during the process of forming the layer on the core or subsequent treatment steps. Non-limiting examples of compositions which can be used as the inner core are white sand quartz, glass beads, amorphous silica, aluminas, gibbsite, mullite, silica-alumina and cordierite. It should be pointed out that silica-alumina is not a physical mixture of silica and alumina but means an acidic and amorphous material that has been cogelled or coprecipitated. This term is well known in the art, see e.g. U.S. Pat. No. 3,909,450; U.S. Pat. No. 3,274,124 and U.S. Pat. No. 4,988,659 all of which are incorporated by reference. A preferred alumina is alpha-alumina. The shape of these inner cores is any desirable shape which includes without limitation spheres, irregularly shaped particles, multi-lobe particles, pills, etc. The effective average diameter of these cores varies from the nano scale to the mm scale, i.e. $10^{-9}$ m to $10^{-3}$ m. Although even single crystals can be used as the inner core, typically the average diameter ranges from about 0.01 μm to about 5 mm, preferably from about 10 μm to about 5 mm. By effective diameter is meant the diameter of a sphere which would be obtained by molding any of the desired shapes into a sphere.

The inner core particles are slurried in water (at the appropriate pH) but preferably dispersed in an aqueous mixture which contains all the reactants necessary to prepare the desired molecular sieve, but which are at a concentration less than the critical supersaturation concentration. It is most preferred that the mixture contain the reactants or nutrients at their equilibrium saturation level. One especially preferred mixture is the aqueous phase which is obtained at the end of the instant process after the desired layered composition is filtered. It is envisioned that this aqueous phase can be recycled a number of times and reused to prepare layered molecular sieves.

The molecular sieves which are deposited onto the inner core to form a molecular sieve layer are microporous compositions with a three dimensional framework which have crystallographically uniform pores. These sieves are classified as either zeolitic or non-zeolitic molecular sieves. Zeolites are alumino-silicate compositions in which the framework structure is composed of $SiO_2$ and $AlO_2$ tetrahedral oxides. Non-zeolitic molecular sieves are those which contain elements other than aluminum and silicon. Examples include silicoalumino-phosphates and aluminophosphate molecular sieves. The zeolitic and non-zeolitic molecular sieves which can be prepared using the process of the present invention have a three dimensional framework structure and a framework composition represented by the general empirical formula:

$$(El_wAl_xP_ySi_z)O_2 \quad (1)$$

where El is an element capable of forming a three-dimensional framework (tetrahedral) oxide unit as described below, and P, Al and Si are also framework elements present as tetrahedral oxide units. The mole fraction of El is represented by "w" and has a value from zero to about 0.5, "x" is the mole fraction of Al and has a value from 0 to about 0.5, "y" is the mole fraction of P and has a value from 0 to about 0.5 and "z" is the mole fraction of Si and has a value from 0 to about 1, w+x+y+z=1 and "y" and "z" are not simultaneously zero. When "El" comprises two or more elements, "w" represents the mole fraction of said elements ($El_1$, $El_2$, $El_3$, $El_4$ etc.) and "w" equals the sum of "$w_1$", "$w_2$", "$w_3$", "$w_4$", etc. which represents, respectively, the mole fractions of $El_1$, $El_2$, $El_3$, $El_4$ etc. These molecular sieves have been given the acronym ElAPSO and are described in detail in U.S. Pat. No. 4,793,984 which is incorporated in its entirety by reference. The criteria for selecting the El element is also presented in the '984 patent. The El is characterized by at least one of the following criteria:

1) "El" is characterized by an electronic orbital configuration selected from the group consisting of $d^0$, $d^1$, $d^2$, $d^5$, $d^6$, $d^7$, or $d^{10}$ where the small crystal field stabilization energy of the metal ligand "—O-El" favors tetrahedral coordination of element El with $O^{2-}$, as discussed in "Inorganic Chemistry" J. E. Huheey, Harper Row, p. 348 (1978):

2) "El" is characterized as capable of forming stable oxo or hydroxo species in aqueous solutions as evidenced by a first hydrolysis constant, $K_{11}$, greater than $10^{-14}$, as discussed in "The Hydrolysis of Cations", C. F. Baes and R. E. Mesmer, John Wiley & Sons (1976);

3) "El" is selected from the group of elements known to occur in crystal structure types geometrically related to the different silica modifications, quartz, cristobalite or tridymite, as discussed in E. Parthe, "Crystal Chemistry of Tetrahedral Structures", Gordon and Breach, New York, London, pp. 66-68 (1964); and 4) "El" is an element, which in its cation form is classified by Pearson. (J. E. Huheey, "Inorganic Chemistry", Harper & Row, p. 276 (1978) as "hard" or "borderline" acids which interact with the "hard" base $O^{2-}$ to form more stable bonds than the cations classified as "soft" acids. Specific elements include but are not limited to arsenic, beryllium, boron, chromium, cobalt, nickel, gallium, germanium, iron, lithium, magnesium, manganese, titanium, vanadium, tin and zinc.

From the general formula described above, several classes of molecular sieves can be described and prepared. For example, when "w" and "y" are both zero, the molecular sieves are zeolites or zeolitic molecular sieves. In this case formula (1) becomes $$(Al_xSi_{1-x})O_2 \quad (2)$$

where x has a value from 0 to about 0.5. Specific examples of the zeolites which can be prepared by the present invention include but are not limited to zeolite A, zeolite X, mordenite, silicalite, zeolite beta, zeolite Y, zeolite L, ZSM-12, UZM-4 and UZM-5. UZM-4 and UZM-5 are described in WO 02/36491 and WO 02/36489 respectively which are incorporated in their entirety by reference. When x is zero, the zeolite is silicalite. In the case where "x" in formula (1) is greater than zero one obtains formula (3):

$$(El_wAl_xP_ySi_z)O_2 \quad (3)$$

where "w", "y" and "z" are defined as in formula (1) and x' has a value from greater than 0 to about 0.5. Further, when "w" and "z" are zero in formula (3) or when "w" and "z" are zero and "x" is greater than 0 in formula (1), one obtains the ALPO family of non-zeolitic molecular sieves which are described in detail in U.S. Pat. No. 4,310,440 and U.S. Pat. No. 4,500,651, both of which are incorporated in their entirety by reference. Further, when "w" is zero and "z" is greater than zero in formula (1) or (3) (and "x" is greater than zero in formula (1)) then one obtains the SAPO family of non-zeolitic molecular sieves non-limiting examples of which are SAPO-34 and SAPO-11 which are described in U.S. Pat. No. 4,440,871 which is incorporated in its entirety by reference. When "z" is zero and all other subscripts in either formula (1) or (3) are greater than zero, one has the ElAPO family of non-zeolitic molecular sieves. Finally, when all subscripts in formula (1) or (3) are greater than zero, one has the ElAPSO family of non-zeolitic molecular sieves described above, one example of which is MAPSO-31.

Thus, the slurry will contain the inner core particles along with sources of the framework elements and templating/structure directing agents and water. These templating agents are well known in the art and include but are not limited to alkali metals, alkaline earth metals and organic compounds. The organic compounds are any of those well known in the art and include but are not limited to amines such as piperidine, tripropylamine, dipropylamine, diethanolamine, triethanolamine, cyclohexylamine and quaternary ammonium compounds such as the halide or hydroxide compound of tetramethylammonium, tetrabutyl ammonium, tetraethylammonium, tetrapropylammonium, ethyltrimethylammonium, diethyldimethylammonium, etc. As is well known in the art sources of aluminum include without limitation aluminum alkoxide, pseudoboehmite, gibbsite, colloidal alumina, alumina sol, sodium aluminate, aluminum sulfate, aluminum trichloride and aluminum chlorohydrate. Of the above, preferred aluminum sources are pseudoboehmite, aluminum sulfate, sodium aluminate and aluminum alkoxides such as aluminum isoproxide. Silicon sources include without limitation silica sol, colloidal silica, fumed silica, silica gel, silicon alkoxides, silicic acid and alkali metal silicate such as sodium silicate. Phosphorus sources include without limitation phosphoric acid and organic phosphates such as triethylphosphate.

The sources of the element(s) "El" can be any form which permits the formation in situ of a reactive form of the element, i.e., reactive to form a framework oxide unit of element "El". Compounds of element(s) "El" which may be employed include oxides, hydroxides, alkoxides, nitrates, sulfates, halides, carboxylates, and mixtures thereof. Representative compounds which may be employed include without limitation: carboxylates of arsenic and beryllium; cobalt chloride hexahydrate, alpha cobaltous iodide; cobaltous sulfate; cobalt acetate; cobaltous bromide; cobaltous chloride; boron alkoxides; chromium acetate; gallium alkoxides; zinc acetate; zinc bromide; zinc formate; zinc iodide; zinc sulfate heptahydrate; germanium dioxide; iron (II) acetate; lithium acetate; magnesium acetate; magnesium bromide; magnesium chloride; magnesium iodide; magnesium nitrate; magnesium sulfate; manganese acetate; manganese bromide; manganese sulfate; titanium tetrachloride; titanium carboxylates; titanium acetate; zinc acetate; tin chloride; and the like.

In addition to the above components, the slurry can optionally contain seeds of the molecular sieve which is deposited onto the inner core. Seeds are useful in that they can agglomerate onto the inner core and allow increased nucleation or can grow larger. These seeds can be prepared by means well known in the art using conventional methods described in the patents cited and incorporated above, which involve mixing sources of the reactants, e.g. aluminum source, silicon source and templating structure directing agent in a vessel and heating to a temperature (with or without pressure) until crystalline product is obtained.

To the slurry described above sources of the desired framework element(s), hereinafter referred to as nutrient(s), are added intermittently such that the nutrient(s) concentration goes above the critical saturation concentration at which point nucleation occurs and crystals begin to form. As crystals form and grow, they will agglomerate around the inner core particles and form a layer around the core.

The nutrient or combination of nutrients which are added are any of those which can form a molecular sieve. These combinations include without limitation: 1) silicon source; 2) aluminum and silicon sources; 3) aluminum, phosphorus and silicon sources; 4) aluminum and phosphorus sources; 5) El and silicon sources; 6) El, aluminum and phosphorus sources; and 7) El, aluminum, silicon and phosphorus sources. It should also be pointed out that additional templating agent/structure directing agent may need to be added. This can be done by adding the desired source of the agent with one of the nutrients or as a separate stream. Additionally the initial slurry can contain an excess of the desired agent.

Regardless of the choice of nutrients, they can be added by any convenient means. These means include preparing solutions of the nutrients, preparing solid suspensions or slurries, adding solids directly and adding neat nutrients. Of course one nutrient can be added by one method, while other nutrient(s) can be added by another method. Additionally, depending on the particular nutrient additional acid or base may need to be added to arrive at the desired pH. For example when sodium silicate is used as the nutrient or source of silicon, acid may need to be added to neutralize the sodium hydroxide which may be generated.

When more than one nutrient is added, e.g. Si and Al, they can be added simultaneously or sequentially. By using sequential addition, one need use only one pump in the case of liquids or slurries. Simultaneous addition can be carried out in one of two ways. First, each nutrient is fed into the reactor containing the seed slurry using individual ports or injectors. Second, the individual nutrients can be fed into a holding tank, mixed and then fed as one stream into the reactor containing the slurry. The latter method is preferred.

The nutrients are added intermittently or pulsed until the concentration of the nutrients in the reaction mixture is above the critical super saturation concentration and nucleation occurs thereby forming crystals of the molecular sieve. As the crystals form they will agglomerate onto the inner core and form a first layer over the core. Control of agglomeration and homogeneity of the mixture is achieved by introducing shear into the reaction mixture. Shear can be applied by mechanical means, hydraulic means etc. Specific methods of applying shear include but are not limited to stirrers, impellers, ultrasound, opposed jets, etc. The amount of shear is controlled such that excessive agglomeration does not occur but the shear is not so great so to break away the layer from the inner core.

Although the nutrient(s) can be intermittently added to the reaction mixture until a layer of the desired thickness is formed, it is preferred to carry out the nutrient(s) addition as follows. First, the nutrient(s) are intermittently added to form a layer of molecular sieve crystals onto the inner core. This is carried out for a first time period which can vary widely but is typically from about 0.1 hr to about 72 hrs. During this pulsed addition period, the pulses can last from about 1 second to about 5 minutes with the time between pulses being from about 10 seconds to about 3 hours. Next, the nutrient(s) are added continuously such that the nutrient(s) concentration is below the critical super saturation concentration but above the saturation concentration. In this regime the molecular sieve crystals that were deposited onto the inner core will begin to grow but substantially no further nucleation of new crystals will occur. The continuous addition is carried out for a second time period which can typically range from about 1 hr to about 72 hrs. During the continuous addition period, the nutrient(s)' addition rate is controlled such that it is essentially the same as the crystal growth rate. The crystal growth rate is determined empirically using analytical techniques such as Scanning Electron Microscopy (SEM). Another way to control the continuous addition rate is to measure and keep the concentration of each nutrient between the saturation concentration and the critical supersaturation concentration. The intermittent and continuous additions can be carried out as many times as necessary to obtain the desired layer thickness. Although, the thickness of the molecular sieve layer can vary widely, typically it ranges from about 0.1 μm to about 150 μm.

The reaction conditions for forming and growing the crystals are the same as those used in conventional processes and include autogenous pressure and a temperature of about room temperature (20° C.) to about 250° C. Higher pressures can be used and usually can be as high as 300 psig. Once the desired layer thickness is obtained, nutrient addition is stopped and the layered composition is separated from the aqueous phase or mother liquor by methods well known in the art such as filtration, centrifugation, etc.

Seed crystals of the desired molecular sieve can optionally be added during the synthesis procedure. The addition of seeds helps to control surface area since if agglomeration occurs, the total surface area of the particles is decreased. Thus, adding small seeds will increase the surface area and thus counteract the surface area loss occurring as a result of agglomeration. This control in surface area in turn facilitates the control in nutrient(s) addition rate. That is, if the particles agglomerate and the average diameter of the particles increases, the nutrient addition rate needs to be decreased. As the rate decreases, it can become harder to control, thus increasing the surface area allows better control of the addition rate.

Although the above description describes a process for depositing a single molecular sieve layer, the process can be repeated more than once in order to arrive at a multilayer product. Thus, the isolated layered composition is slurried in a reaction mixture which contains reactive sources of El, Al, P and Si per equation (1). Again, reactive sources are intermittently added for a third time period and optionally alternated between intermittent and continuous addition. The only restriction on forming this second layer is that the molecular sieve have a different structure than the first layer (or layer immediately below it) or have the same structure but be different in at least one framework element. For example, the first layer could be silicalite while the second layer could be zeolite Y. Alternatively, the first layer could be ALPO-34 while the second layer could be SAPO-34.

In another embodiment of the invention, the second layer can be a composition other than a molecular sieve. Examples of these other compositions include but are not limited to aluminas, silica, silica-alumina, zirconia, titania, alumina-phosphates, zinc oxides, tin oxides, iron oxides, ruthenium oxides and mixtures thereof. These compositions can be formed in situ by precipitating the oxides onto the layered composition from a slurry comprising particles of the layered composition and a solution containing precursors of the oxide. These oxides can form more than one layer in a multi layer composition. As stated, the only criteria for a layer in a multilayer composition is that adjacent layers not have the same structure and composition.

The layered compositions of this invention are capable of separating mixtures of molecular species based on the molecular size (kinetic diameter) or on the degree of polarity of the molecular species. When the separation of molecular species is based on molecular size, separation is accomplished by the smaller molecular species entering the intracrystalline void space while excluding larger species. The kinetic diameters of various molecules such as oxygen, nitrogen, carbon dioxide, carbon monoxide are provided in D. W. Breck, *Zeolite Molecular Sieves*, John Wiley and Sons (1974) p. 636.

The layered compositions of the present invention either as-synthesized or after modification can be used as catalysts or catalyst supports in hydrocarbon conversion processes. Hydrocarbon conversion processes are well known in the art and include ring-opening, cracking, hydrocracking, alkylation of both aromatics and isoparaffins, isomerization, polymerization, reforming, dewaxing, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. No. 4,310,440 and U.S. Pat. No. 4,440,871 which are incorporated by reference.

Hydrocracking conditions typically include a temperature in the range of 400° to 1200° F. (204-649° C.), preferably between 600° and 950° F. (316-510° C.). Reaction pressures are in the range of atmospheric to about 3,500 psig (24,132 kPa), preferably between 200 and 3000 psig (1379-20,685 kPa). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178-8,888 std. $m^3/m^3$), preferably between 2,000 and 30,000 scf per barrel of charge (355-5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the UZM-9 composition using feedstocks such as gas oils, heavy naphthas, deasphalted crude oil residua, etc. with gasoline being the principal desired product. Temperature conditions of 850° to 1100° F. (454 to 593° C.), LHSV values of 0.5 to 10 $hr^{-1}$ and pressure conditions of from about 0 to 50 psig (0 to 345 kPa) are suitable.

Alkylation of aromatics usually involves reacting an aromatic, especially benzene, with a monoolefin ($C_2$ to $C_{12}$) to produce a linear alkyl substituted aromatic. The process is carried out at an aromatic:olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig (1379 to 6895 kPa). Further details on apparatus may be found in U.S. Pat. No. 4,870,222 which is incorporated by reference.

Alkylation of isoparaffins with olefins to produce alkylates suitable as motor fuel components is carried out at temperatures of −30' to 40° C., pressures from about atmospheric to about 6,894 kPa (1,000 psig) and a weight hourly space velocity (WHSV) of 0.1 to about 120 $hr^{-1}$. Details on paraffin alkylation may be found in U.S. Pat. No. 5,157,196 and U.S. Pat. No. 5,157,197, which are incorporated by reference.

Other reactions may be catalyzed by these layered compositions, including base-catalyzed side chain alkylation of alkylaromatics, aldol-condensations, olefin double bond isomerization and isomerization of acetylenes, alcohol dehydrogenation, and olefin dimerization, oligomerization and conversion of alcohol to olefins. Suitably ion exchanged forms of these materials can catalyze the reduction of $NO_x$ to $N_2$ in automotive and industrial exhaust streams. Some of the reaction conditions and types of feeds that can be used in these processes are set forth in U.S. Pat. No. 5,015,796 and in H. Pines, The Chemistry Of Catalytic Hydrocarbon Conversions, Academic Press (1981) pp. 123-154 and references contained therein, which are incorporated by reference.

The following examples are set forth to illustrate the invention. It is to be understood that the examples are only by way of illustration and are not intended as an undue limitation on the broad scope of the invention as set forth in the appended claims.

EXAMPLE 1

To a reaction vessel containing 486 g of deionized water, there were added, with stirring, 90 g of sodium hydroxide pellets followed by 213 g of 60 mesh sand. The mixture was then heated to 81° C. and solutions of sodium aluminate and sodium silicate were individually pumped into the vessel. The solutions were pumped at rates of 1100 mL/hr and 1650 mL/hr respectively in pulses followed by a delay time (interval) during which no solution was added. The pulse length and interval time are presented in the table below.

| Pulse Time (sec) | Interval Time (min) |
|---|---|
| 39 | 87 |
| 39 | 55 |
| 47 | 56 |
| 47 | 42 |

At the end of the experiment the solids were filter and washed with water. The resultant solid product (270 g) was found to consist of sand coated with zeolite A and zeolite A fines. Further analysis showed that the zeolite A layer on the sand was approximately 4 microns thick.

EXAMPLE 2

To a reaction vessel containing 485 g of deionized water, there were added with stirring, 90 g of sodium hydroxide pellets followed by 230 g of 1.5 mm soda lime beads. The mixture was then heated to 81° C. and solutions of sodium aluminate and sodium silicate were individually pumped into the vessel. The solutions were pumped at rates of 260 mL/hr and 274 mL/hr respectively in pulses followed by a delay time (interval) during which no solution was added. The pulse length and interval time are presented in the table below.

| Pulse Time (sec) | Interval Time (min) |
|---|---|
| 39 | 90 |
| 39 | 78 |
| 109 | 6 |
| 150 | 90 |

At the end of the experiment the solids were filter and washed with water. Analysis showed that the product consisted of beads coated with zeolite N and zeolite N fines. The zeolite N layer on the beads was found to be about 1 micron.

EXAMPLE 3

To a 2 L vessel there were added 80 g of alpha alumina cores with an average particle size of about 70 μm (Versal™ 900), 88 g of zeolite Y seeds (Si/Al$_2$=5 and an average particle size of about 1.0 μm) and 616.4 g of a recycled mother liquor solution with an analysis of (12.4 wt % Si, 0.21 wt % Al and 9.0 wt % Na in H$_2$O) and the mixture heated to 95° C. with stirring. Aqueous solutions of sodium silicate (29 wt. % SiO$_2$ and 9 wt. % Na$_2$O) and sodium aluminate (24 wt. % Al$_2$O$_3$ and 20 wt. % Na$_2$O) were added to the vessel in pulses of increasing length as shown in the following table.

| Pulse Time (sec) | Interval Time (min) | Silicate feed rate (mL/hr) | Aluminate feed rate (mL/hr) |
|---|---|---|---|
| 31 | 15 | 3800 | 520 |
| 32 | 15 | 3800 | 520 |
| 33 | 15 | 3800 | 520 |
| 34 | 15 | 3800 | 520 |
| 35 | 15 | 3800 | 520 |
| 36 | 15 | 3800 | 520 |
| 37 | 15 | 3800 | 520 |
| 38 | 15 | 3800 | 520 |
| 39 | 15 | 3800 | 520 |

At the end of the pulsed addition sequence a continuous addition of nutrients was carried out using 455.6 mL of the same sodium silicate and 62.3 mL of the same sodium aluminate solutions at a constant rate over 146 minutes. After the nutrient addition, the product was filtered, washed and then dried at room temperature. The mother liquor was retained for recycle. The solids were washed, screened and elutriated to retain the beads that were between 20 and 150 μm. The yield was 70.0 g of sized beads.

To a 2 L vessel there were added 88 g of the zeolite Y seeds, 616.4 g of a recycled mother liquor solution with an analysis of (4.76 wt % Si, 0.06 wt % Al & 3.72 wt % Na in H$_2$O) and 65 g of the sized beads, the mixture was heated to 95° C. with stirring. Aqueous solutions of sodium silicate (29 wt. % SiO$_2$ and 9 wt. % Na$_2$O) and sodium aluminate (24 wt. % Al$_2$O$_3$ and 20 wt. % Na$_2$O) were added or shown in the following table.

| Pulse Time (sec) | Interval Time (min) | Silicate feed rate (mL/hr) | Aluminate feed rate (mL/hr) |
|---|---|---|---|
| 31 | 15 | 3800 | 520 |
| 32 | 15 | 3800 | 520 |
| 33 | 15 | 3800 | 520 |
| 34 | 15 | 3800 | 520 |
| 35 | 15 | 3800 | 520 |
| 36 | 15 | 3800 | 520 |
| 37 | 15 | 3800 | 520 |
| 38 | 15 | 3800 | 520 |
| 39 | 15 | 3800 | 520 |
| 40 | 15 | 3800 | 520 |
| 41 | 15 | 3800 | 520 |
| 42 | 15 | 3800 | 520 |
| 43 | 15 | 3800 | 520 |

At the end of the pulsed addition sequence a continuous addition of nutrients was carried out using 241.7 mL of the same sodium silicate and 33.1 mL of the same sodium aluminate solutions at a constant rate over 78.5 minutes. After the nutrient addition, the product was filtered, washed and then dried at room temperature. The mother liquor was retained for recycle. The solids were washed, screened and elutriated to retain the beads that were between 20 and 150 μm. The yield was 84.9 g of sized beads.

The above procedure was repeated using 80 g of the sized beads with 88 g zeolite Y seeds and 616.4 g of recycled mother liquor. The yield was 95.1 g of sized beads.

To a reactor there were added 80 g of sized beads from the above paragraph, 88 g of zeolite Y seeds and 616.4 g of recycled mother liquor and the mixture was heated to 95° C. with stirring. Aqueous solutions of sodium silicate (29 wt. % SiO$_2$ and 9 wt. % Na$_2$O) and sodium aluminate (24 wt. % Al$_2$O$_3$ and 20 wt. % Na$_2$O) were added to the vessel in pulses of increasing length as shown in the following table.

| Pulse Time (sec) | Interval Time (min) | Silicate feed rate (mL/hr) | Aluminate feed rate (mL/hr) |
|---|---|---|---|
| 31 | 15 | 3800 | 520 |
| 32 | 15 | 3800 | 520 |
| 33 | 15 | 3800 | 520 |
| 34 | 15 | 3800 | 520 |
| 35 | 15 | 3800 | 520 |
| 36 | 15 | 3800 | 520 |
| 37 | 15 | 3800 | 520 |
| 38 | 15 | 3800 | 520 |
| 39 | 15 | 3800 | 520 |

At the end of the pulsed addition sequence a continuous addition of nutrients was carried out using 455.6 mL of the same sodium silicate and 62.3 mL of the same sodium aluminate solutions at a constant rate over 146 minutes. After the nutrient addition, the product was filtered, washed and then dried at room temperature. The mother liquor was retained for recycle. The solids were washed, screened and elutriated to retain the beads that were between 20 and 150 μm. The yield was 99.4 g of sized beads.

The beads were ammonium ion exchanged with 10% ammonium nitrate solution at 75° C. The exchanged beads were steamed at 600° C. for 2 hrs in 50% steam then re-exchanged.

What is claimed is:

1. A process for preparing a layered composition comprising an inner core and an outer layer, the outer layer comprising a molecular sieve having a three dimensional microporous framework structure and a framework composition represented by an empirical formula of:

$$(El_w Al_x P_y Si_z)O_2 \quad (1)$$

where El, Al, P and Si are framework elements present as tetrahedral oxide units, "w" is the mole fraction of El and has a value from 0 to about 0.5, "x" is the mole fraction of Al and has a value from 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero, the process comprising providing at reaction conditions a slurry comprising inner core particles dispersed in a liquid comprising reactive sources of El, Al, P and Si corresponding to formula (1); intermittently adding to the slurry nutrient(s) to provide framework element(s) of the molecular sieve per formula (1), thereby forming crystals of the molecular sieve and agglomerating the crystals onto the inner core and carrying out the intermittent addition for a first time period to form a first layer of the molecular sieve on the inner core and where the inner core is selected from the group consisting of aluminas, silica-alumina, cordierite, mullite, white sand quartz, gibbsite, silica, and mixtures thereof.

2. The process of claim 1 where the inner core comprises alpha alumina.

3. The process of claim 1 where El is selected from the group consisting of Mg, Ni, As, Ga, Ge, Mn, Co, Sn, Ti, Fe, Cr, Be, B, V, Zn and mixtures thereof.

4. The process of claim 1 where the reaction conditions include a temperature of about 20° C. to about 250° C. and autogenous pressure.

5. The process of claim 1 where the aluminum source is selected from the group consisting of sodium aluminate, colloidal alumina, alumina sol, pseudoboehmite, aluminum sulfate, aluminum alkoxides and mixtures thereof.

6. The process of claim 1 where the silicon source is selected from the group consisting of sodium silicate, fumed silica, silica gel, silica sol, colloidal silica, silicon alkoxides and mixture thereof.

7. The process of claim 1 where the El source is selected from the group consisting of oxides, hydroxides, alkoxides, nitrates, sulfates, halides, carboxylates and mixtures thereof.

8. The process of claim 1 further comprising after the first time period adding the nutrient(s) continuously for a second time period thereby growing the molecular sieve crystals and where the continuous addition rate essentially equals the crystal growth rate.

9. The process of claim 8 where the intermittent and continuous addition steps are repeated at least 2 times.

10. The process of claim 1 where the molecular sieve layer has a thickness from about 0.1 to about 150 microns.

11. The process of claim 1 where the nutrient is a silicon source.

12. The process of claim 1 where the nutrients are selected from the group consisting of 1) an aluminum and a phosphorous source; 2) an aluminum and a silicon source; 3) an aluminum, a silicon and a phosphorous source; 4) an El source and a silicon source; 5) an El source, an aluminum source and a phosphorous source and 6) an El source, an aluminum source, a phosphorous source and a silicon source.

13. The process of claim 12 where the nutrients are simultaneously added.

14. The process of claim 12 where the nutrients are sequentially added.

15. The process of claim 1 further comprising isolating the layered composition, forming a second layer on the first layer by forming a slurry comprising particles of the layered composition; intermittently adding to the slurry nutrient(s) to provide framework element(s) of the molecular sieve per formula (1), thereby forming crystals of the molecular sieve and agglomerating the crystals onto the first layer and carrying out the intermittent addition for a third time period to form a second layer of a second molecular sieve on the layered composition and further where the molecular sieve of the second layer has a different structure or a different empirical composition than the molecular sieve of the first layer.

16. The process of claim 15 further comprising after the third time period adding the nutrient(s) continuously for a fourth time period thereby growing the molecular sieve crystals and where the continuous addition rate essentially equals the crystal growth rate.

* * * * *